P. F. AUGENBRAUN.
KNOB SPINDLE AND MEANS FOR SECURING KNOBS THERETO.
APPLICATION FILED JAN. 10, 1912.
1,058,524.
Patented Apr. 8, 1913.
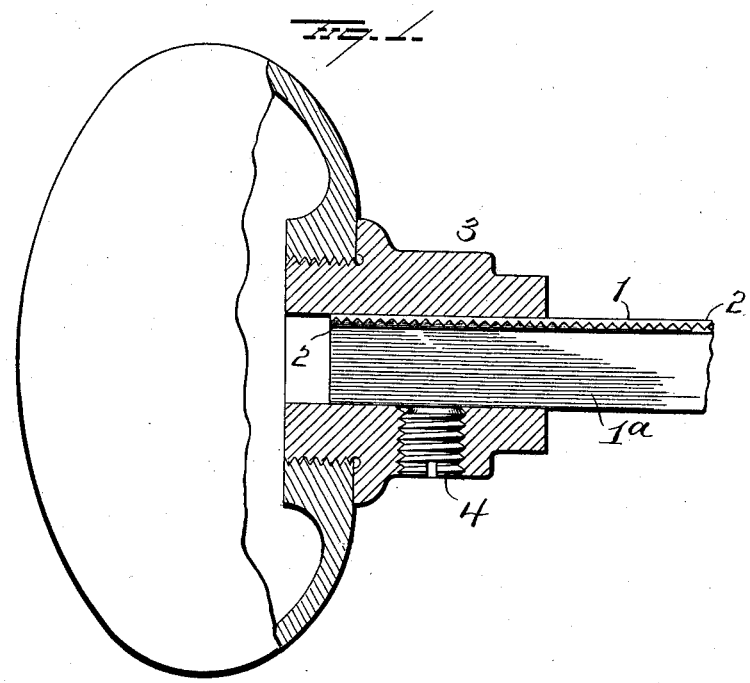
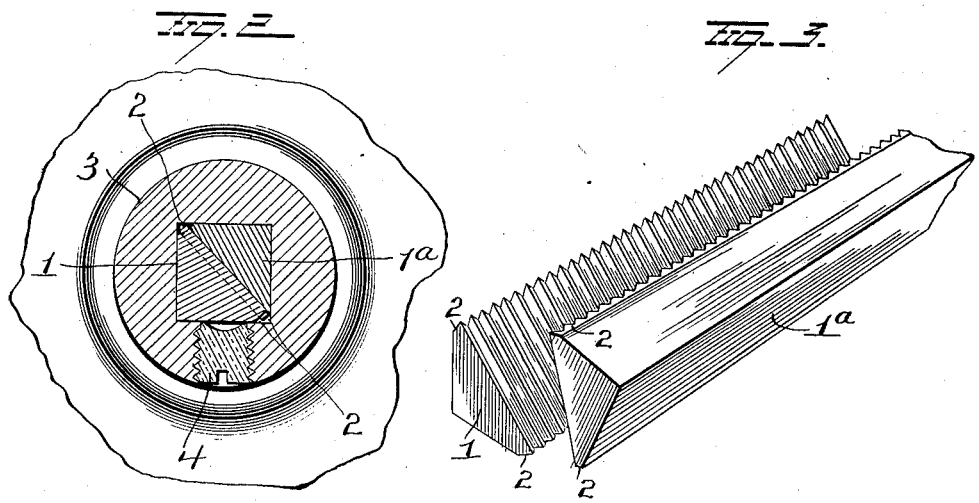
WITNESSES
INVENTOR
Attorney
COLUMBIA PLANOGRAPH CO., WASHINGTON, D. C.

UNITED STATES PATENT OFFICE.

PETER F. AUGENBRAUN, OF STAMFORD, CONNECTICUT, ASSIGNOR TO THE YALE & TOWNE MANUFACTURING COMPANY, OF STAMFORD, CONNECTICUT.

KNOB-SPINDLE AND MEANS FOR SECURING KNOBS THERETO.

1,058,524.   Specification of Letters Patent.   Patented Apr. 8, 1913.

Application filed January 10, 1912.  Serial No. 670,449.

*To all whom it may concern:*

Be it known that I, PETER F. AUGENBRAUN, a citizen of the United States, residing at Stamford, in the county of Fairfield and State of Connecticut, have invented certain new and useful Improvements in Knob-Spindles and Means for Securing Knobs Thereto; and I do hereby declare the following to be a full, clear, and exact description of the invention, such as will enable others skilled in the art to which it appertains to make and use the same.

My invention relates to an improvement in knob spindles and means for securing knobs thereto, and it consists in the details of construction as will be more fully described and pointed out in the claim.

In the accompanying drawings, Figure 1 is a view in longitudinal section through the knob shank; screw and spindle, Fig. 2 is a view in transverse section through the same parts and Fig. 3 is a view of the two parts of the spindle showing the corrugated face of each.

The spindle is divided longitudinally into two triangular sections 1 and 1ª, which, when in proper relative position, form a spindle, angular, and preferably square, in cross section. The meeting or abutting faces of the two sections of the spindle, are minutely ribbed or corrugated or otherwise roughened so that they will be free to move upon each other transversely or in a line at right angles to the axis of the spindle, but cannot move, or be moved, upon each other in a line parallel with said axis. The edge or angles of the two sections, at the opposite ends of the corrugations are cut away or made blunt as at 2, so as to permit of sufficient sliding movement of the section on each other past their centers to compensate for any looseness of the spindle in the knob shank 3.

The two sections 1 and 1ª, each of which is triangular in cross section, form, when placed in proper relative position, a spindle square or angular in cross section, which is inserted in the usual spindle socket of the shank 3 of the knob, which latter is locked to the spindle by set screw 4, passing through the shank 3 and bearing against a flat face of one of the sections of the spindle. The pressure of the screw against the flat face of one section, causes the latter to slide transversely on the other section or each to slide on the other, and thus force the two sections against three walls of the spindle socket in the knob, thus securely locking the two parts of the spindle against the possibility of independent longitudinal movement, and locking the spindle as a whole to the knob.

With this construction it will be apparent that the socket in the knob spindle may be of appreciably greater size than the cross section of the spindle, which difference in size is compensated for by the sliding of the sections on each other, so that under all conditions the spindle bears against three walls of the socket in knob spindle, consequently there can be no movement of the knob on the spindle when the parts are connected by the screw 4.

I prefer to use a set screw having a cupped or concaved end as shown, which when forced against the spindle will indent or bite into the latter slightly and thus lock the spindle against endwise movement in the knob.

It is evident that many slight changes might be resorted to in the relative arrangement of parts shown and described without departing from the spirit and scope of my invention. Hence I would have it understood that I do not wish to confine myself to the exact construction and arrangement of parts shown and described, but

Having thus fully described my invention what I claim as new and desire to secure by Letters-Patent, is:—

As a new article of manufacture, a two part spindle, each part being straight from end to end and triangular in cross section, the abutting faces of the two sections being corrugated transversely throughout their lengths, whereby the sections may move in planes at right angles to the axis of the spindle but will be restrained against independent longitudinal movement the two edges of the meeting faces of both sections
5 of the spindle being flattened at the ends of the corrugations, and knobs detachably secured to the ends of said spindle.

In testimony whereof, I have signed this specification in the presence of two subscribing witnesses.

PETER F. AUGENBRAUN.

Witnesses:
SCHUYLER MERRITT,
WILLIAM P. MOSELY.

Copies of this patent may be obtained for five cents each, by addressing the "Commissioner of Patents, Washington, D. C."